United States Patent [19]
Lee

[11] Patent Number: 5,274,351
[45] Date of Patent: Dec. 28, 1993

[54] RESISTANCE UNIT FOR MOTOR SPEED CONTROL

[76] Inventor: Woo Y. Lee, 371-132, Myenmok 4-Dong, Dongdaimoon-ku, Seoul, Rep. of Korea

[21] Appl. No.: 878,670

[22] Filed: May 5, 1992

[30] Foreign Application Priority Data

Mar. 11, 1992 [KR] Rep. of Korea .................. 92-3915

[51] Int. Cl.$^5$ .............. H01C 13/00; H01C 7/10; H01C 1/012; H01C 1/14
[52] U.S. Cl. .................... 338/221; 338/24; 338/307; 338/308; 338/309; 338/330
[58] Field of Search ............. 338/221, 307-328, 338/330, 24, 51, 308, 309

[56] References Cited

U.S. PATENT DOCUMENTS

| 4,719,441 | 1/1988 | Horn | 338/307 X |
| 4,935,717 | 6/1990 | Osawa et al. | 338/51 |
| 5,000,662 | 3/1991 | Yamamoto et al. | 338/308 X |

*Primary Examiner*—Marvin M. Lateef
*Attorney, Agent, or Firm*—Morgan & Finnegan

[57] ABSTRACT

The present invention relates to a resistance unit for controlling a motor speed of driving a blower of an automobile air conditioner. The resistance unit includes a resistance circuit board printing a plurality of resistors in the form of double layers on both sides thereof, a supporting plate for mounting the board and a plurality of lead frames each of which is electrically connected to a corresponding terminal of the resistors, and a socket, combined with the supporting plate, taking a part of each lead frame therein.

11 Claims, 5 Drawing Sheets

FIG. 5
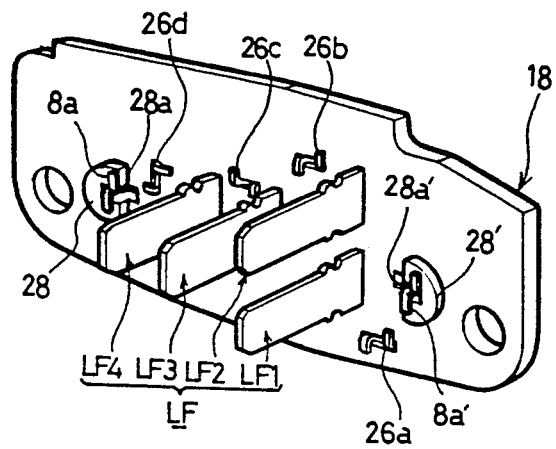
FIG. 6A
FIG. 6B
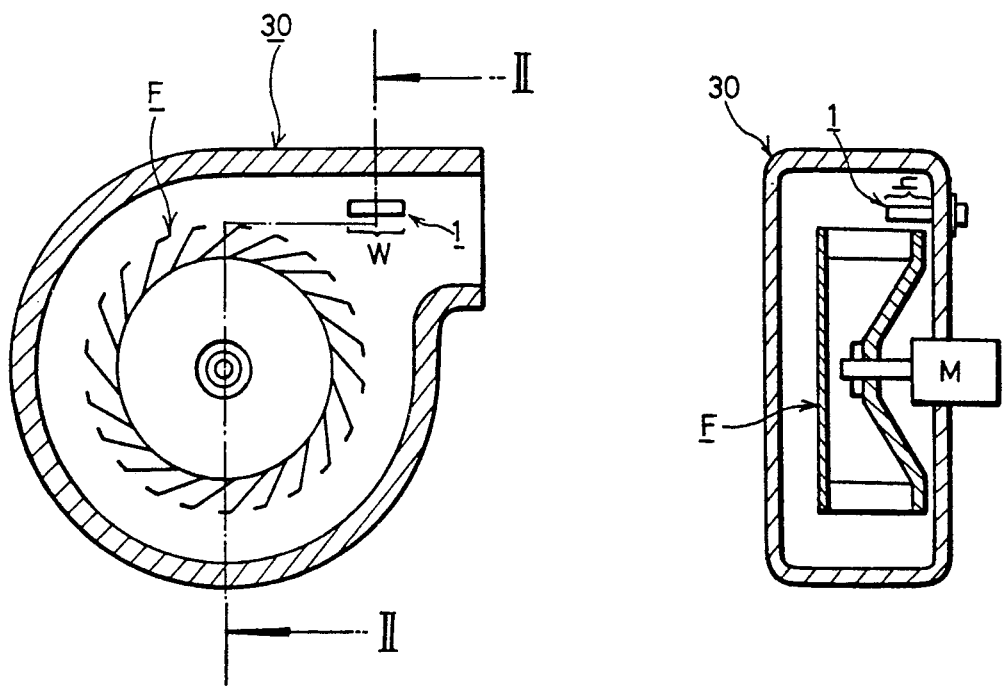

5,274,351

RESISTANCE UNIT FOR MOTOR SPEED CONTROL

BACKGROUND OF THE INVENTION

The present invention relates to a resistance unit for a motor speed control, and more particularly relates to a resistance unit for controlling a motor speed of driving a blower of an automobile air conditioner.

A prior art relating to a flat resistance for a blower control unit of an automobile air conditioner is set forth in U.S. Pat. No. 5,000,662. However, this type of flat resistance has disadvantages as follows:

Firstly, since a plurality of flat resistors are printed on one side of a resistance circuit board, a size of the board is relatively large. Therefore, the airflow generated by a blower is obstructed from the large size of the board, thereby decreasing the airflow in quantity and strength. The flat resistance is fastened to a bottom wall of a fan scroll in such a manner that the resistance circuit board projects into an air output passage within the fan scroll.

Secondly, a resistance circuit which is printed on one side of the board and having a predetermined pattern has therefore a limited amount of space between neighboring portions. Therefore, the neighboring portions of the thermally interfere with each other, causing a false operation of the resistance circuit and shortening a life of the same.

Thirdly, a plurality of lead frames are integrally formed with the board. Accordingly, there is an inconvenience in assembling the board with a socket. Furthermore, it is impossible to freely arrange the board onto a supporting frame of the socket. Moreover, a part of the lead frames of the board is simply inserted into the socket without any mounting means. Therefore, the board is easily separated from the socket by an impact.

Fourthly, a temperature fuse is interposed in a middle part of the pattern of the resistance circuit. Therefore, a by-product being generated from melting of the soldered portion of the temperature fuse causing damage to the resistance circuit.

SUMMARY OF THE INVENTION

Accordingly, a principal object of the present invention is to provide an improved resistance unit for motor speed control having a resistance circuit board in which a plurality or resistor are printed on both sides of the board, thereby decreasing the size of the board and preventing disadvantages of a big board.

Another object of the invention is to provide an improved resistance unit for motor speed control which is conveniently in assembled on a circuit board with a socket.

This invention provides further advantages in that the board is prevented from being easily separated from the socket by caulking means formed with the board itself and a plurality of lead frames.

A still another object is to provide an improved resistance unit for motor speed control which is durable because of a plurality of resistor formed by at least two layers.

A still another object is to provide an improved resistance unit for motor speed control in which a temperature fuse is positioned on the lowest part of the resistance circuit board, thereby preventing damages by a by-product being generated from melting of the soldered portion of the fuse to a resistance circuit.

According to the present invention, a resistance unit having a resistance circuit board for motor speed control in which said resistance circuit board comprises a main portion having a metallic flat substrate and an insulating layer coated on the surface of the main portion; a resistance circuit having a plurality of resistances electrically connected in series, the resistance circuit formed by printing a predetermined pattern of the resistors on both surfaces of the main portion; and at least one mounting means projecting outwardly from an edge of the main portion.

The resistance unit further comprises: a supporting plate having at least one first coupling means for coupling said mounting means, a plurality of first holes for fixing a plurality of lead frames, a plurality of second holes for passing the plurality of lead frames thereinto, and at least one second coupling means for coupling the supporting plate with a socket; the plurality of lead frames each of which includes a head part shaped of a fork for being electrically connected to one end of a corresponding one of the resistances, a body part having a fixing element shaped of fingers for fixing the lead frame to a corresponding first hole of the supporting plate, and an end part for being electrically connected to a motor driving circuit, having a certain length from the fixing element of the body part and passing through a corresponding second hole of the supporting plate; and the socket having a head for combining to the supporting plate and a body integrally formed with the head to extend downwards from the head, the body including a hollow opening downwards for receiving said end parts of the plurality of lead frames passing through a corresponding third holes formed with the head.

Other features and operations of the present invention will become apparent from the following detailed description of the invention when taken in conjunction with the accompanying drawings.

BRIEF DESCRIPTION OF THE DRAWINGS

FIG. 5 is a bottom view of a supporting plate caulked of a resistance circuit board and a plurality of lead frames;

FIG. 6A is a horizontal sectional view of a blower having a resistance unit according to the present invention incorporated into it;

FIG. 6B is a vertical sectional view taken along the line II—II in FIG. 6A;

DETAILED DESCRIPTION OF THE PREFERRED EMBODIMENTS

Figure 1:
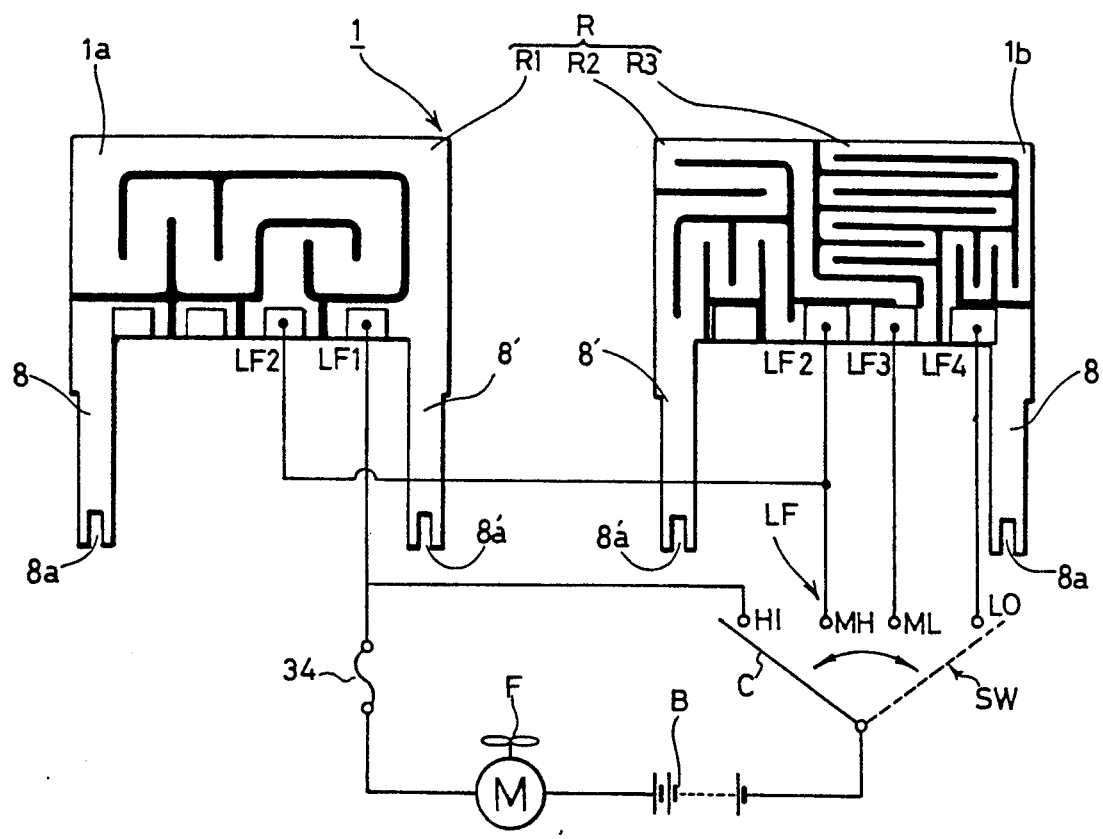
FIG. 1 is an electric circuit diagram for controlling motor speed of a blower utilizing a resistance circuit board according to one embodiment of the present invention.

As shown in FIG. 1, a plurality of resistances R1, R2 and R3 forming a resistors circuit are printed on both front and back sides of resistance circuit board 1. Each of lead frames LF1 to LF4 is connected between one end of a corresponding one of resistors R1 to R3 and a corresponding one of selecting terminals HI, MH, ML and LO of selecting switch SW of which a fixed terminal is connected to a motor through battery B. A high speed terminal HI is also electrically connected to the motor for driving fan F of a blower of an automobile air conditioner. Lead frame LF2 is commonly contacted on both sides of the resistance circuit board at a middle high speed terminal. Therefore, the fan speed is controlled by operating moving selector C so as to contact one of selecting terminals HI, MH, ML and LO.

A couple of mounting means 8 and 8' are integrally formed with resistance circuit board 1 projecting downwardly from a main portion that the resistors are printed. Each of the mounting means is a flat bar having at least two fingers 8a and 8a'.

Figure 3:
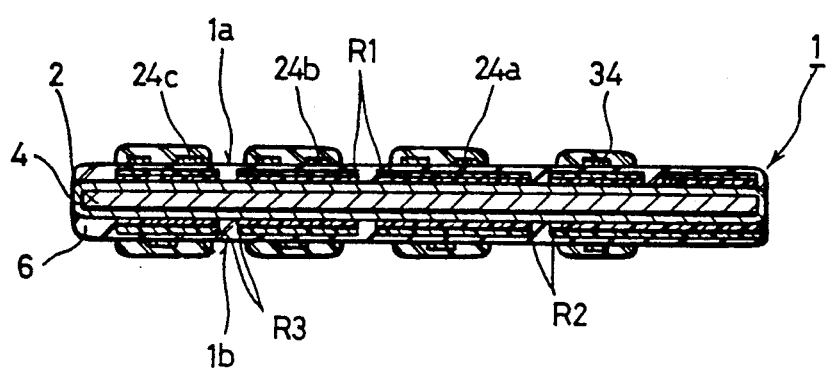
FIG. 3 is an enlarged sectional view taken along the line I—I in FIG. 1.

As shown in FIG. 3, resistance circuit board 1 according to the present invention includes metallic flat substrate 2, first insulating layer 4 coating over the whole surface of the metallic flat substrate with a constant thickness, resistance circuit R printed on both front and back sides of first insulating layer 4, and second insulating layer 6 coating over the resistance circuit in order to protect the circuit. A plurality of resistors R1 to R3 according to the present invention are printed so as to form at least two layers. That is, the resistors are firstly printed by a conductive ink and then the printing process is repeated with the same material. The reason why the plurality of resistors R1 to R3 are made of two layers is that each of them has a durability under a high temperature at the portion connected to a corresponding one of lead frames.

Figure 2:
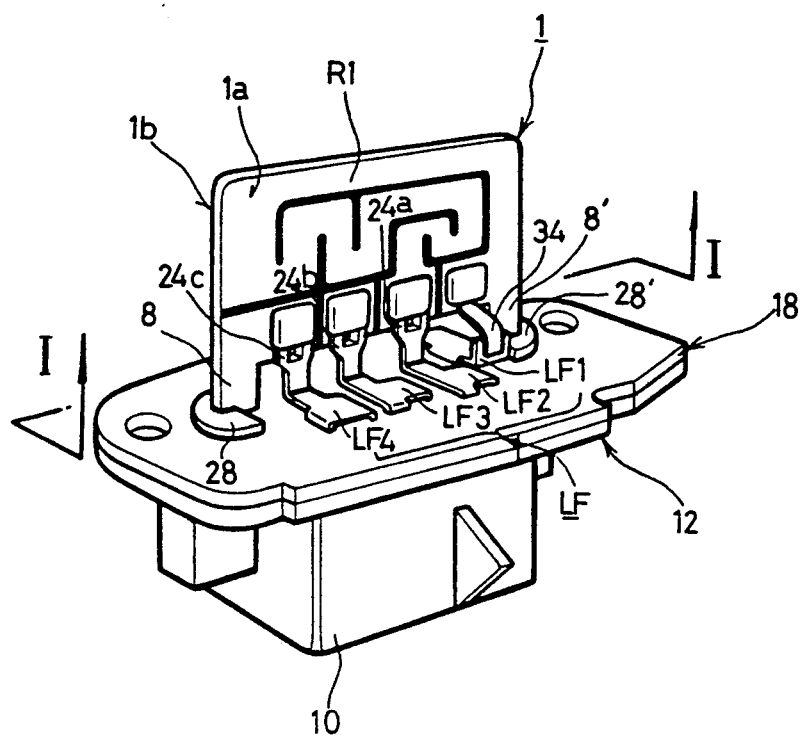
FIG. 2 is a perspective view of a resistance unit for motor speed control according to the present invention.
Figure 4:
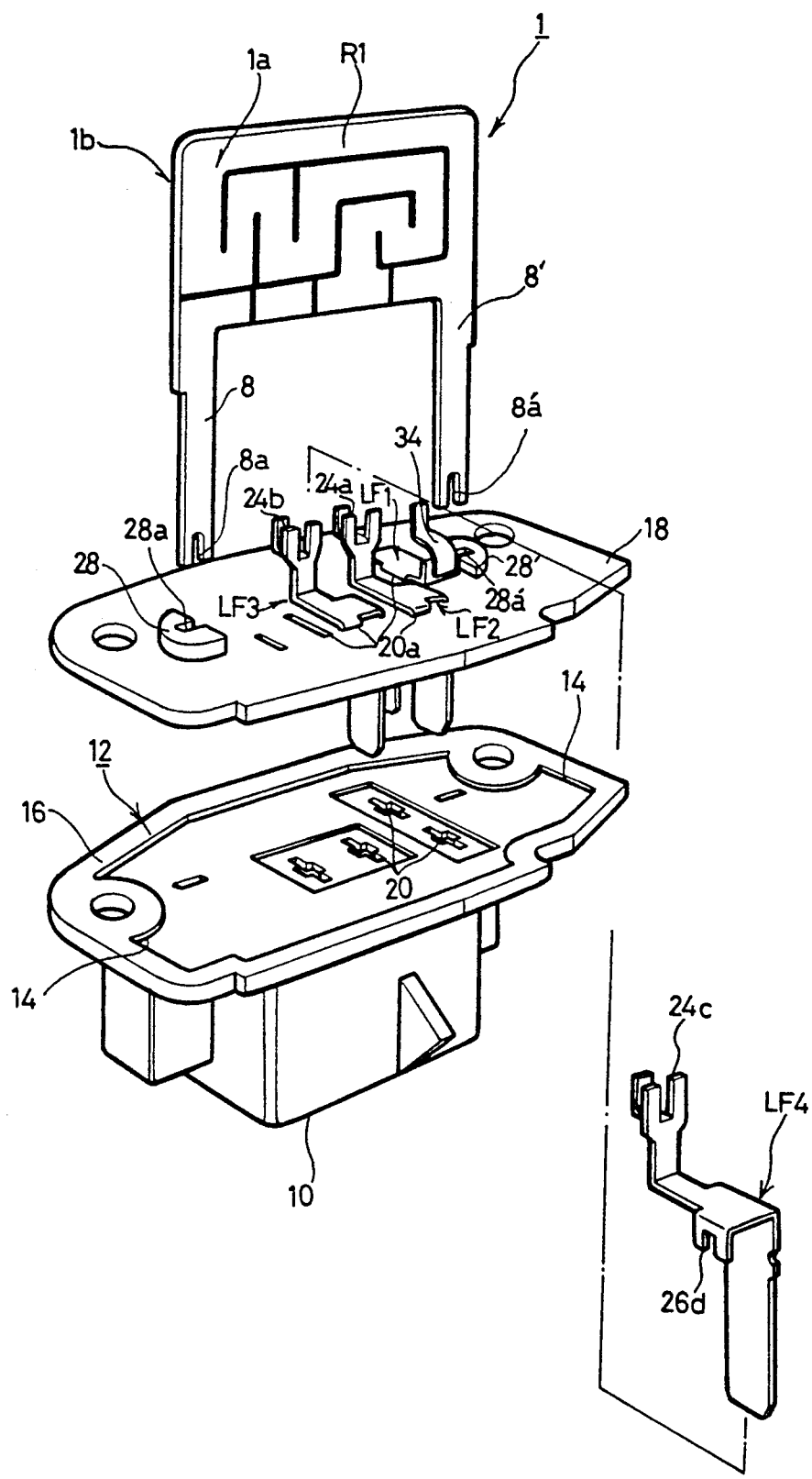
FIG. 4 is a separated perspective view of FIG. 2.

As shown in FIGS. 2 and 4, the resistance unit of the present invention has socket 10 in which supporting frame 12 having flange 16 is integrally formed at the upper part, supporting plate 18 having an external shape as same as an external shape of supporting frame 12, and a plurality of lead frames LF1 to LF4.

Each of lead frames except lead frame LF1 is formed of a head part 24a, 24b or 24c in the shape of a fork for being electrically connected to one end of a corresponding one of the resistor, a body part having a fixing element 26b, 26c, or 26d with fingers for fixing the lead frame to supporting plate 18, and the end part having a certain length from the fixing element of the body part. Lead frame LF1 is the same as the other lead frames LF2 to LF4 with the exception of having no head part. Temperature fuse 34 is interposed between a corresponding resistance and a body part of lead frame LF1.

Supporting plate 18 is formed of a plurality of first holes for fixing a plurality of lead frames, a plurality of second holes for passing the end part of a corresponding one of the lead frames respectively, and a couple of third holes for fixing supporting plate 18 to socket 10 by coupling means. Supporting plate 18 is further formed or a couple of coupling means 28. Each of the coupling means have an aperture 28a or 28a' formed with the supporting plate for passing mounting means 8 or 8' of resistance circuit board 1 thereinto, and an overhang 28 or 28' formed around the aperture on both sides of the supporting plate. Supporting frame 12 of socket 10 is formed of a plurality of holes 20 for passing the end part of a corresponding one of lead frames LF1 to LF4 thereinto respectively.

Each of lead frames LF1 to LF4 is fixed to supporting plate 18 in such a manner that fingers of the fixing element are calked in the opposite direction from each other on the back side of the supporting plate after passing through a corresponding one of the first holes of the supporting plate. In this case, each end part of the lead frames is passing through a corresponding one of the plurality of second holes. Resistance circuit board 1 is mounted to supporting plate 18 by combining each of mounting means 8 and 8' with a corresponding one of coupling means of supporting plate 18. That is, after inserting the couple of mounting means 8 and 8' into a corresponding one of apertures 28a and 28a', two fingers of each end part 8a or 8a' are, as shown in FIG. 5, bent in the opposite direction from each other on a corresponding overhang 28 or 28' formed with the back side of the supporting plate.

When the mounting means 8 and 8' are inserted into the corresponding apertures 28a and 28a', resistance circuit board 1 is also mounted to a plurality of lead frames LF1 to LF3 by inserting the terminals of resistors into a corresponding forked shaped head part 24a to 24c, of lead frames LF2 to LF4. In order to more firmly connect the terminals to the lead frames, the connecting portions are soldered as shown in FIG. 3. Since there is a lot of conventional way in combining supporting plate 18 to supporting frame 12 of socket 10, an explanation is omitted.

Temperature fuse 34 is interposed between high speed terminal HI of a resistance circuit and lead frame LF1. The fuse deactivates the resistance circuit under the permissible maximum temperature. The temperature fuse can be interposed between any one or more of terminals and a corresponding one of lead frames. Although temperature fuse 34 is formed of a spring having a shape of flat bar in FIG. 2, the fuse can be a fine wire.

FIG. 6A is a horizontal sectional view of a blower having a resistance unit incorporated into it, and FIG. 6B is a vertical sectional view taken along the line II—II in FIG. 6A. As shown in FIGS. 6A and 6B, the resistance unit of the invention is fastened to a wall of blower 30 in such a manner that resistance circuit board 1 projects into an air passage of the blower. Thus, since the size of the resistance circuit board according to the present invention is, as mentioned before, smaller than a conventional one, the airflow generated by a blower is less obstructed by the board, thereby increasing the wind in quantity and strengthening the airflow.

Figure 7:
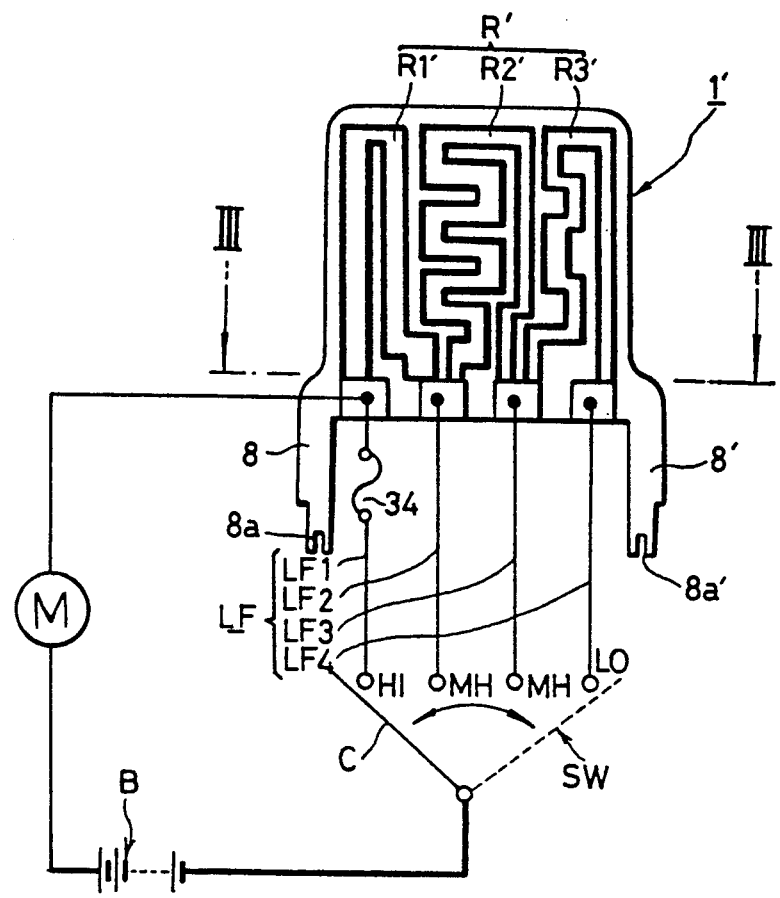
FIG. 7 is an electric circuit diagram for controlling motor speed of a blower utilizing a resistance circuit board according to another embodiment of the present invention.
Figure 8:
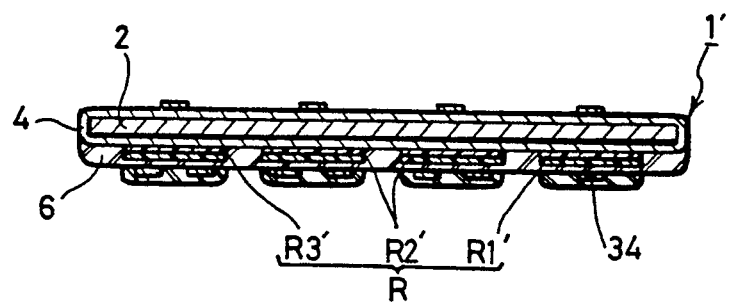
FIG. 8 is an enlarged sectional view taken along the line III—III in FIG. 7.

FIG. 7 and FIG. 8 illustrate another embodiment according to the present invention. As can be appreciated from FIGS. 7 and 8, all features of this embodiment are the same as those of the other embodiment with the exception that a plurality of resistors are printed on one side of the resistance circuit board 1'.

As described above, the resistance unit for motor speed control according to the present invention has the following advantages.

First, since a plurality of resistances are printed on both sides of a resistance circuit board, the size of the board is marvelously decreased. Therefore, the movement of a wind generated by a blower is less obstructed from the board. Furthermore, raw material is reduced in manufacturing the board.

Second, in the case of printing resistors on both sides, a space between neighboring pathes of the printed resistances can be broadened. Therefore, heat generated from any one of resistors does not affect the neighboring resistance, thereby extending a life of the resistance circuit.

Third, since the resistance circuit board is mounted onto a plurality of lead frames combined with a supporting plate, the resistance circuit board can be easily assembled with a socket.

Fourth, the resistance circuit board is not easily separated from the socket by caulking means formed with the board itself and a plurality of lead frames.

Fifth, the resistors are prevented from corrosion due to heat generated from the soldered portion connected to a lead frame because the resistors are made with at least two layers.

Sixth, a temperature fuse is positioned on the lowest part of the resistance circuit board, thereby preventing damages by a by-product being generated from melting of the soldered portion of the fuse to a resistance circuit.

While the invention has been illustrated and described with the preferred embodiments, it is recognized that variations and changes can be made without departing from the scope and spirit of the invention as set forth in the claims.

What is claimed is:

1. A resistance unit having a resistance circuit board for motor speed control, said resistance circuit board comprising:
    a main portion having a metallic flat substrate and an insulating layer coated on the surface of the main portion;
    a resistance circuit having a plurality of resistors electrically connected in series, the resistance circuit formed by printing a predetermined pattern of the resistors on both surfaces of the main portion, the pattern of resistors on one of the surfaces being electrically insulated from the pattern on the other; and
    at least one mounting means integrally formed with and projecting outwardly from an edge of the main portion.

2. A resistance unit according to claim 1, wherein each of said resistors is printed so as to form at least two layers.

3. A resistance unit according to claim 1, wherein said mounting means is shaped of a flat bar having at least two fingers with its end portion.

4. A resistance unit according to claim 3, further comprising:
    a supporting plate having at least one first coupling means for coupling said mounting means, a plurality of first holes for fixing a plurality of lead frames, a plurality of second holes for passing the plurality of lead frames thereinto, and at least one second coupling means for coupling the supporting plate with a socket;
    each of said plurality of lead frames includes a head part shaped of a fork for being electrically connected to one end of a corresponding one of the resistors, a body part having a fixing element with fingers for fixing the lead frame to a corresponding first hole of the supporting plate, and an end part, for being electrically connected to a motor driving circuit, having a certain length from the fixing element of the body part and passing through a corresponding second hole of the supporting plate; and
    the socket having a head for being combined to the supporting plate and a body integrally formed with the head to extend downwards from the head, the body including a hollow opening downwards for receiving said end parts of the plurality of lead frames passing through a corresponding third holes formed with the head.

5. A resistance unit according to claim 4, further comprising: at least one temperature fuse, electrically interposed between one of the lead frames and one end of a corresponding one of the resistors by soldering, for deactivating the resistance circuit upon reaching the permissible maximum temperature.

6. A resistance unit according to claim 5, wherein the temperature fuse is made of a nichrome.

7. A resistance unit according to claim 5, wherein each end of the resistors is positioned on a low part of the resistance circuit board so that a by-product being generated from melting of the soldered portion of the temperature fuse does not affect to the resistance circuit.

8. A resistance unit according to claim 4, wherein said first coupling means include an aperture formed with the supporting plate for passing the mounting means thereinto, and a couple of overhangs each of which is formed around the aperture on both sides of the supporting plate.

9. A resistance unit according to claim 8, wherein said fingers of the mounting means of the resistance circuit board are calked in the opposite direction from each other onto the overhang formed with the back side of the supporting plate after passing through the aperture.

10. A resistance unit according to claim 4, wherein each of the lead frames is connected to the corresponding one of the resistors by receiving the end portion thereof into fingers of the fork type head part of the lead frame.

11. A resistance unit according to claim 10, wherein the connecting portions are soldered.

* * * * *